Figure 1:
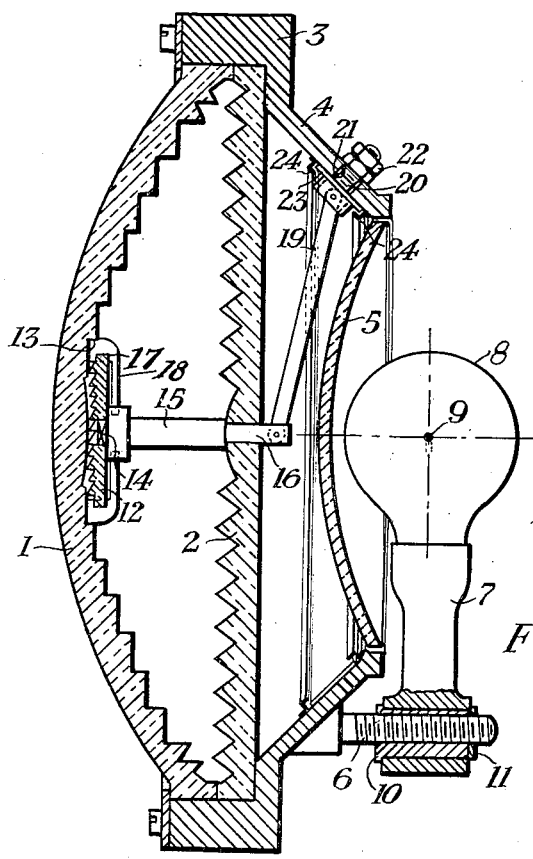

Dec. 5, 1939.　　　　M. A. MARTIN　　　　2,182,155

LIGHT PROJECTING DEVICE

Filed Sept. 30, 1937

INVENTOR
Marcel A. Martin.
BY
HIS ATTORNEY

Patented Dec. 5, 1939

2,182,155

UNITED STATES PATENT OFFICE 2,182,155

LIGHT PROJECTING DEVICE

Marcel Alfred Martin, Paris, France, assignor, by mesne assignments, to The Union Switch & Signal Company, Swissvale, Pa., a corporation of Pennsylvania Application September 30, 1937, Serial No. 166,676
In France June 4, 1937

6 Claims. (Cl. 177—329)

This invention relates to light projecting devices and more particularly but not exclusively to light signal devices for railways or roads.

Light signal devices for railways and roads usually comprise a source of light, such for instance as an electric incandescent lamp, located in a suitable casing at the focus of an optical system of relatively short focal length with the object of projecting a relatively intense substantially parallel beam of light which can readily be observed at a relatively great distance from the signal device. In order to ensure that the indication given by such a light signal device can be observed in the vicinity of the signal device, a light deflecting device is usually associated with the optical system in such a way as to divert a portion of the light rays emitted by the signal device downwardly and laterally to a position adjacent the signal. Such a light deflecting device may, for instance consist of a prismatic member comprising one or more parallel prisms and made integral with the outer lens of the optical system or separate from the optical system.

Now the position of individual light signal devices with regard to railway tracks or roads both as regards their height above the track or road and their lateral distance therefrom varies very considerably being dependent upon local conditions for each signal device and it is therefore necessary to be able to adjust the light deflecting device of each individual signal device so that a portion of the light rays emitted by the signal device may be diverted in the required direction dependent upon the height of the signal device above the track or road and its lateral distance therefrom.

If the light deflecting device be made integral with the outer lens of the optical system and be located at the central portion of this lens, it can be adjusted so as to orientate the auxiliary or diverted beam of light by rotating the lens in its mounting in the casing of the signal device. However the adjustment must be capable of being effected at the location of the signal device along the track or road in order to ensure the diversion of the auxiliary beam to the required position and this adjustment must not interfere with the accurate adjustment of the source of light with respect to the optical system. In order to permit rotation of the outer lens for the purpose referred to hereinbefore it is found that a certain amount of play is necessary between the lens and its mounting and in these circumstances when the lens is rotated in its mounting the optical axis may be inadvertently displaced with respect to the source of light and owing to the short focal length of the optical system even a relatively small displacement of this axis will result in a considerable loss of power of the main beam emitted by the signal device which should be a substantially parallel beam, it being understood that the focussing of the signal device is fixed once and for all before the device is set up at its location adjacent the track or road.

Figure 2:
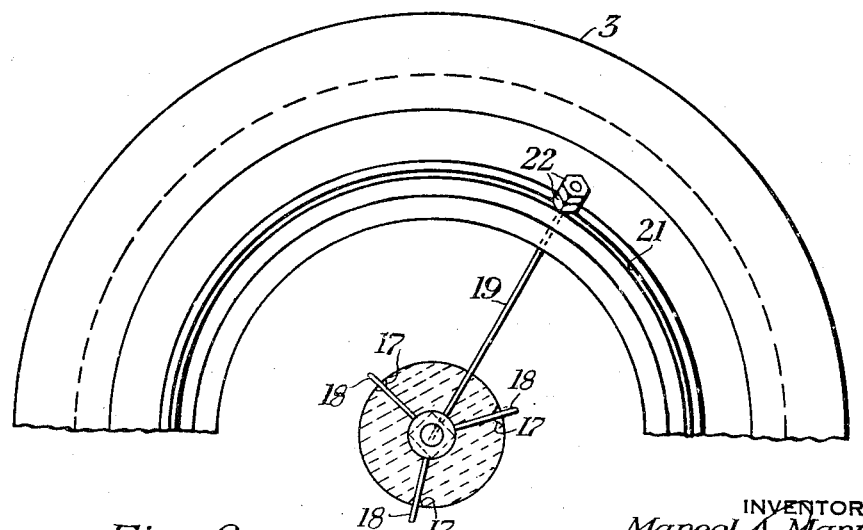

According to the principal feature of the present invention however the light deflecting device is arranged to be readily adjustable, for the purpose referred to hereinbefore, from the exterior of the optical system independently of the adjustment of the source of light at the focus of the optical system. Other features of the invention will become apparent from the following description of an embodiment of the invention which will now be given, by way of example only, with reference to the accompanying drawing in which:

Figure 1 is a somewhat diagrammatic central sectional view through the optical system and associated source of light (constituted in this example by an electric incandescent lamp) of a light projecting or signal device embodying the invention, and Figure 2 is a rear view of the device shown in Figure 1 with the lenses of the optical system removed.

Referring now to the drawing, the optical system of the light projecting or signal device comprises two stepped lenses 1 and 2 (so called Fresnel lenses) constituting a doublet of relatively short focal length in the usual manner. The outer lens 1 is a bi-convex stepped lens and the inner lens 2 a plano-convex stepped lens, the doublet constituted by these lenses being carried in a suitable mounting 3 having an inwardly extending conical portion 4 at the inner end of which is carried a plate of glass 5, which is preferably dished as shown, in order to reduce loss of light by reflection.

Integral with or rigidly secured to the mounting 3 is a supporting member or bolt 6 which carries a holder 7 for the source of light which in this example is as shown an electric incandescent lamp 8 having a filament 9. The holder 7 is initially adjusted by suitable means 10 so that the source of light proper (i. e.) the filament 9 is at the focus of the optical system and is then fixed once and for all in position on the supporting member or bolt 6, for instance by means of solder or the like as indicated at 11.

In accordance with the present invention a light deflecting member 12 is located at the inner side of the central portion of the outer lens 1, this deflecting member consisting in the present example as shown in the drawing of a circular plate comprising a number of parallel prisms or prismatic portions at its outer surfaces. The deflecting member is provided with a central polygonal aperture in which engages the corresponding outer polygonal end 14 of a rotary stem 15 having a reduced inner end portion 16 of circular cross section extending through a central circular aperture through the inner lens 2. The outer periphery of the light deflecting member is recessed or slotted at 17 as shown more clearly in Figure 2 and the outer ends of a number of thin strip members 18 integral with or rigidly secured to the outer end of the rotary stem 15 engage in these recesses or slots 17. The outer ends of the strips 18 are rotatably supported by the internal step 13 on the inner surface of the outer lens 1, and it will be seen therefore that the deflecting member is indirectly supported by the step 13. The inner reduced end 16 of the rotary stem 15 is coupled by means of a thin strip member 19 or strip members with the inner end of a bolt 20 extending through a slot 21 extending around a part of the conical portion 4 of the mounting 3. By moving the bolt 20 along the slot 21 around the conical portion 4, the stem 15 is rotated and the light deflecting member 12 is correspondingly rotated through the intermediary of the polygonal end 14 of the stem 15 and the thin strips 18 engaging in the grooves 17. The bolt 20 can be secured in any desired position along the slot 21 corresponding to the required orientation of the light deflecting member 12 by means of a nut 22, an additional lock nut being provided if desired.

In order to prevent the entrance of dust or other foreign matter into the interior of the mounting a circularly curved frusto-conical plate 23 is provided which is carried by the bolt 20 and located in suitable guides 24 inside the conical portion 4 of the mounting 3. It should be noted that the means provided for rotating the light deflecting member are very thin and do not to any substantial degree interfere with the efficient projection of light from the source.

The assembled parts described hereinbefore may as will be evident be mounted in a suitable dust and watertight casing.

The invention has been described by way of example as applied to a particular construction of light projecting device comprising a doublet of Fresnel lenses and an incandescent electric lamp but it will be evident that the invention is readily applicable to any kind of light projecting device comprising an optical system of relatively short focal length and adapted to emit a substantially parallel beam of light where it is required to deflect a portion of the light from the source to a position adjacent to the projecting device which is variable with respect to the projecting device.

The plate of glass 5 may if desired be plane instead of dished and may be coloured and used in conjunction with uncoloured lenses or if coloured lenses are employed the plate of glass 5 may be uncoloured.

It will be evident that the invention is not limited to the particular construction and arrangement of the parts hereinbefore described by way of example which may be varied as desired to suit particular requirements without exceeding the scope of the invention.

Although I have herein shown and described only one form of light projecting devices embodying my invention, it is understood that various changes and modifications may be made therein within the scope of the appended claims without departing from the spirit and scope of my invention.

Having thus described my invention, what I claim is:

1. In a light signal comprising a source of light and a doublet made up of two stepped lenses for projecting a beam of parallel rays from said source to a distant point, the combination therewith of a light deflecting member mounted between said lenses for diverting a portion of the rays from said source to provide an indication to an observer close to the signal, and means connected with said member and extending to a point outside of the optical system for moving said member to different positions to adjust the direction of diversion of the light rays.

2. In a light signal comprising a source of light and a doublet made up of two stepped lenses for projecting a beam of parallel rays from said source to a distant point, the combination therewith of a deflecting member rotatably supported between said lenses for diverting a portion of the rays from said source to provide an indication to an observer close to the signal, and a rotary stem extending through the inner lens and connected at its outer end with said deflecting member for rotating it to different positions to adjust the direction of diversion of the light rays.

3. In a light signal comprising a source of light and a doublet made up of two stepped lenses mounted in a frame for projecting a beam of parallel rays from said source to a distant point, the combination therewith of a deflecting member rotatably supported between said lenses for diverting a portion of the rays emitted by said source to a position adjacent to said signal, means connected with said member and extending through the inner lens for rotating said deflecting member to different positions to adjust the direction of the diversion of the light rays, and means for locking said member in its adjusted position.

4. In a light signal comprising a source of light and a doublet made up of two stepped lenses mounted in a frame for projecting a beam of parallel rays from said source to a distant point, the combination therewith of a deflecting member rotatably supported between said lenses, a stem rotatably mounted in the center of the inner lens and connected at one end with said deflecting member for rotating it to different positions, a thin strip secured to the other end of said stem for rotating it, and a bolt mounted in a slot in said frame for movement to different angular positions and secured to said strip for locking said member in different adjusted positions.

5. In a light signal, in combination, a source of light, a doublet made up of two stepped lenses supported in a mounting for projecting a beam of parallel rays from said source to a distant point, a deflecting member in the form of a circular plate provided on its outer surface with a number of parallel prisms and disposed between said lenses, said deflecting member also being provided with a central polygonal aperture and with a plurality of radially extending recesses, a rotary stem having a reduced inner end portion of circular cross section extending through a central circular aperture provided in the inner lens and provided on its outer end with a polygonal portion which fits into the aperture in said deflecting member and with a number of integral strip members which extend into the recesses in said deflecting member and are supported by the internal step on the inner surface of the outer lens, and means connected with the inner end of said stem for rotating it and for locking it in any position to which it is rotated.

6. In a light signal, in combination, a source of light, a doublet for projecting a beam of parallel rays from said source to a distant point, said doublet being made up of two stepped lenses supported in a mounting having an inwardly extending conical portion, a deflecting member in the form of a circular plate provided on its outer surface with a number of parallel prisms and disposed between said lenses, said deflecting member also being provided with a central polygonal aperture and with a plurality of radially extending recesses, a rotary stem having a reduced inner end portion of circular cross section extending through a central circular aperture provided in the inner lens and provided on its outer end with a polygonal portion which fits into the aperture in said deflecting member and with a number of integral strip members which extend into the recesses in said deflecting member and are supported by the internal step on the inner surface of the outer lens, a relatively thin strip secured at one end to the inner end of said stem for rotating it and at the other end to a bolt slidably mounted in a slot extending around a part of said conical portion, and means on said bolt for securing it in any desired position along the slot in said conical portion to lock said deflecting member in an adjusted position.

MARCEL ALFRED MARTIN.